Jan. 8, 1935. J. R. HUGHES 1,987,297
VEHICLE BODY
Filed Aug. 5, 1933 2 Sheets-Sheet 1
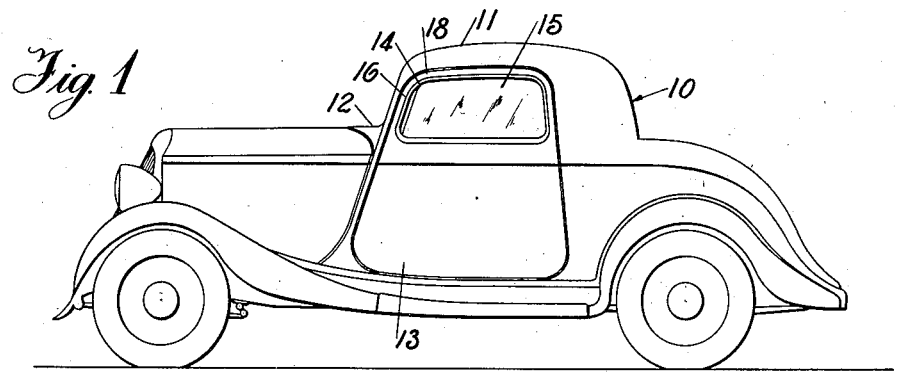
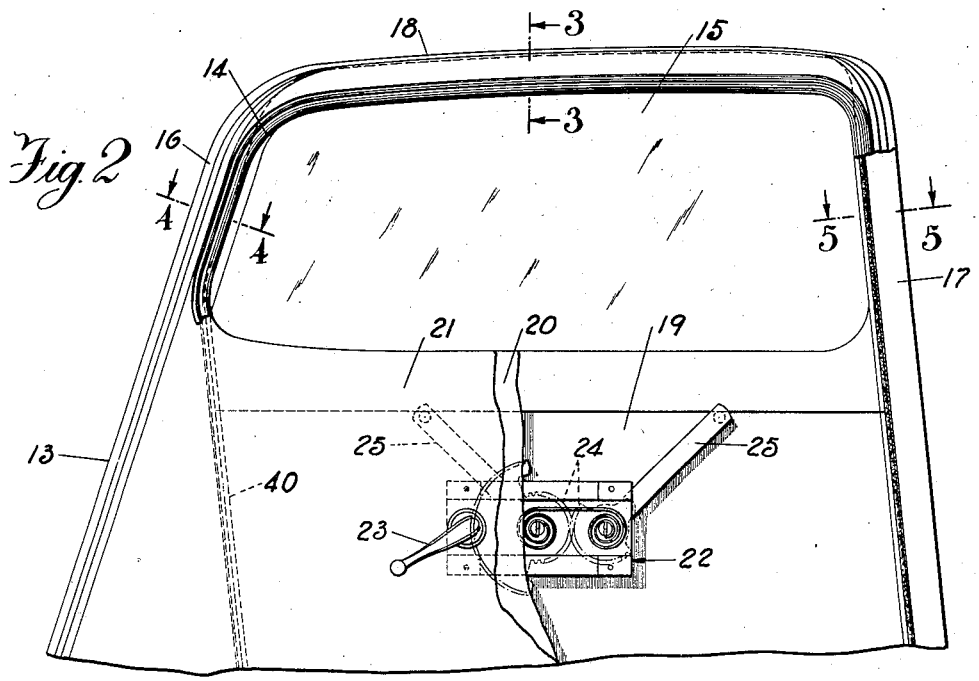
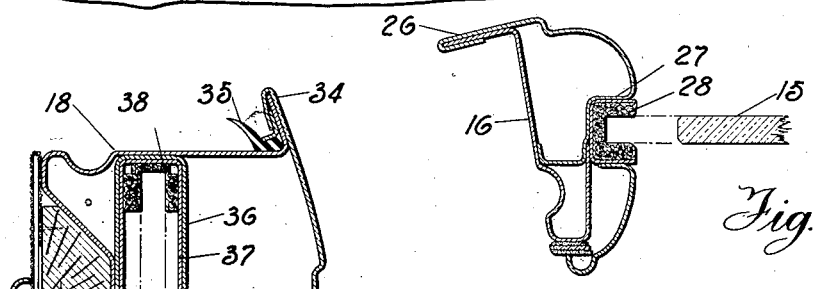
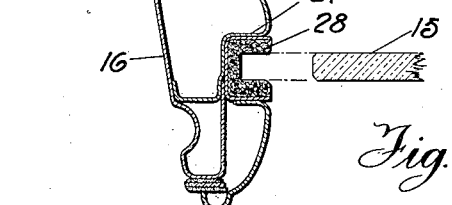
INVENTOR.
BY James R. Hughes
ATTORNEY Jan. 8, 1935.                J. R. HUGHES                1,987,297
                             VEHICLE BODY
                         Filed Aug. 5, 1933         2 Sheets-Sheet 2
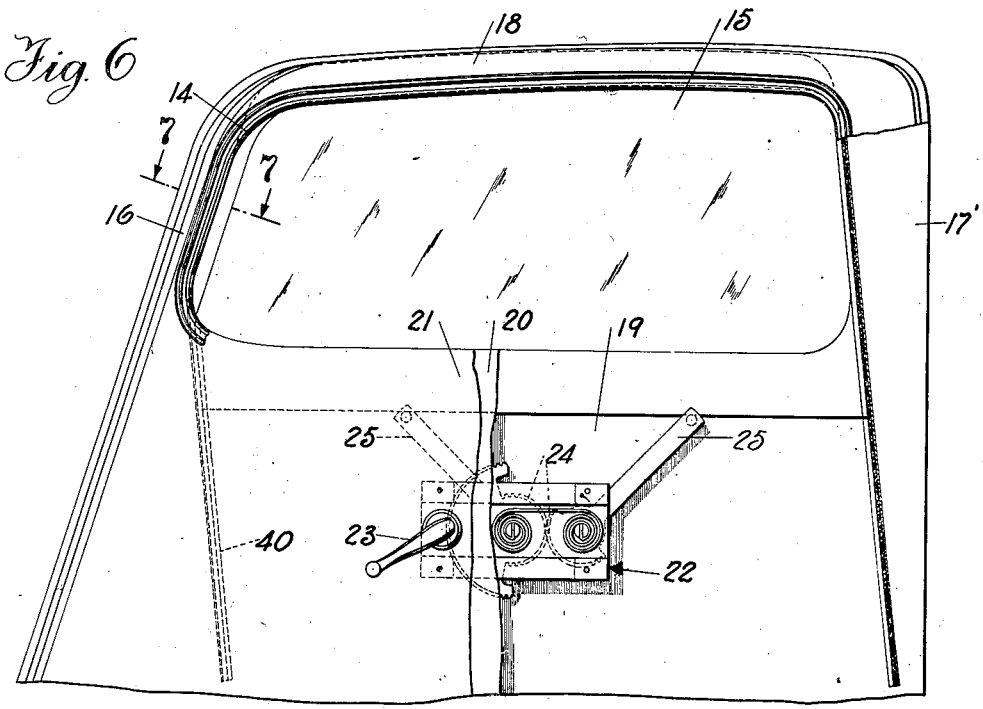
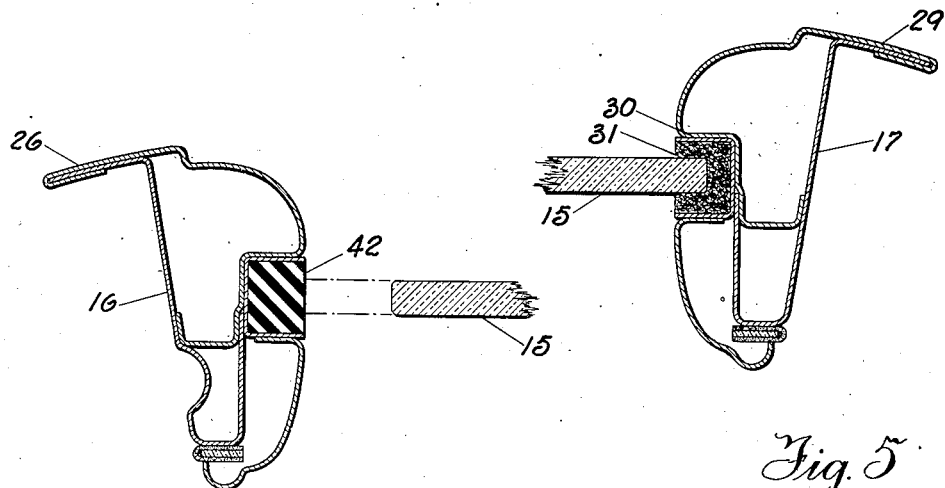
INVENTOR.
BY James R. Hughes
ATTORNEY Patented Jan. 8, 1935

1,987,297

UNITED STATES PATENT OFFICE 1,987,297

VEHICLE BODY

James R. Hughes, South Bend, Ind., assignor to The Studebaker Corporation, Detroit, Mich., a corporation of New Jersey Application August 5, 1933, Serial No. 683,746

3 Claims. (Cl. 296—48)

This invention relates to bodies of the closed type for automotive vehicles, and particularly to means for ventilating such bodies.

The principal object of the invention is to provide doors for the vehicle body which have upwardly converging edge frame members or upwardly converging channels carried thereby, the rear edge frame member being formed to provide a channel in which is slidably mounted a glass closure adapted when moved downwardly to pull away from the front edge frame member to thereby provide a ventilating opening between the forward edge of the glass and the front edge frame member.

A further object is to provide in a vehicle door a header member formed with a deep channel so that as the glass is moved downwardly to provide an opening between the glass and the front edge member, the seal between the upper edge of the glass and the door header member will be unbroken.

A further object of the invention is to provide a vehicle door so formed that when the glass closure is moved downwardly a limited amount, the seal will be unbroken between the glass and door at the top, rear and bottom of the door opening, leaving a ventilating space at the front only of the glass.

A further object is to provide a ventilating system having particular utility in cold weather driving which will permit air to be withdrawn from the body adjacent to the rear of the windshield without setting up currents of air within the body that are annoying to the occupants thereof.

A still further object is to provide ventilating means in the vehicle doors which will permit defrosting of the windshield in cold weather without causing direct draft against the occupants of the vehicle.

Other objects and objects relating to details of construction and methods of manufacture will be apparent from the detailed description to follow.

The accompanying drawings which illustrate two acceptable embodiments of my invention are to be taken as illustrative only and not as limiting the invention, the scope of which is to be measured entirely by the scope of the sub-joined claims.

In the drawings,

Fig. 1 is a side elevation of an automotive vehicle, including a door structure embodying the features of my invention.

Fig. 2 is an enlarged fragmentary detailed view of the inside of one of the vehicle doors, showing the glass lowered to ventilating position.

Fig. 3 is an enlarged sectional view taken on the line 3—3 of Fig. 2, illustrating the door top header member and the seal for the glass when in ventilating position.

Fig. 4 is an enlarged sectional view taken on the line 4—4 of Fig. 2, illustrating the door front edge frame member.

Fig. 5 is an enlarged detailed sectional view taken on the line 5—5 of Fig. 2, illustrating the door rear edge frame member, the glass being in position in the channel formed therein.

Fig. 6 is a fragmentary view similar to Fig. 1, illustrating a modified form of my invention and showing the glass in ventilating position.

Fig. 7 is an enlarged detailed sectional view taken on the line 7—7 of Fig. 6, illustrating the door front edge frame member provided with a channel therein and a resilient pad positioned in the channel flush with the door opening to form a seal for the forward edge of the glass when in closed position.

Although considerable effort has been made in the past to provide an inexpensive ventilating system for automotive vehicle bodies particularly adaptable for use in cold weather, so far as I am aware such constructions have either been too expensive for commercial use or have been unsatisfactory in that currents of air were set up in the body which were objectionable to the occupants of the vehicle. Having had in mind all the disadvantages and objections which have heretofore been encountered by designers of vehicle bodies, I have provided a ventilating system which will permit of properly ventilating the vehicle body in cold weather and which will be of material assistance in preventing frost from forming on the inside of the windshield and the glass closures in the vehicle doors.

Referring to the drawings in which similar reference numerals refer to similar parts throughout the several views, the vehicle body is indicated generally by the numeral 10 which may include a top 11, a cowl 12, and a door 13, having an opening 14 therein and a glass closure 15.

Referring to Fig. 2, the door 13 comprises a front edge frame member 16, a rear edge frame member 17, a top header bar 18, an outer finishing panel 19, which with the edge frame members 16 and 17 and the header bar 18, form the opening 14 referred to above.

I also preferably provide an inner panel 20 having a suitable covering 21, the panel 20 being adapted to support the window regulator indicated generally at 22. The window regulator may be of any approved design, the details of which form no part of my invention and the same should preferably include an operating handle 23, a suitable operating mechanism 24, and a pair of arms 25 engageable with the lower edge of the glass 15, the same being operable to raise and lower the glass to the desired position. As the particular form of regulator mechanism forms no part of my invention, a further description of the same is believed to be unnecessary.

The front edge frame member 16 is preferably formed of sheet metal which may be shaped to any desired form and which preferably includes the flange 26 adapted to overlap the body at the door opening to provide a weather seal. The edge frame member 16 also is preferably shaped to provide a channel 27 therein in which is securely mounted a channel-shaped weather strip 28 formed of suitable flexible material such as felt or rubber and adapted to receive the forward edge of the glass 15 when the same is moved upwardly to full closed position.

The rear edge frame member 17 is also preferably formed of sheet metal which may be shaped in any suitable form and which preferably has a flange 29 also adapted to overlap the body at the rear of the door opening to provide a weather seal. The side frame member 17 is also formed to provide a channel 30 in which is suitably secured a channel-shaped weather strip 31 also formed of suitable flexible material such as felt or rubber. The rear edge of the glass 15 preferably rides in the channel-shaped weather strip 31 at all times; that is, during the raising and lowering of the window and also when the glass is in full closed position, as it is not the desire to at any time break the seal between the glass and the door at the rear of the glass.

The door header bar 18 which is preferably formed of sheet metal is boxed-shaped in cross section and is preferably provided with a flange 34 along the upper edge adapted to overlap the body at the top of the door opening to provide a weather seal therefor. In order that there may be a suitable seal between the door and the body along the top thereof, I may also make use of a flexible weather strip 35 suitably attached to the header bar, as for example, as illustrated in Fig. 3. The header bar 18 is preferably formed to provide a deep channel 36 therein, and a channel-shaped member 37 having a suitable flexible weather strip 38 mounted in the base thereof may be secured in any suitable manner to the channel 36 such as by rivets, spot-welding or by any other means known to those skilled in the art. Adjacent to the free edges of the channel member 37, I also provide flexible pads 39 between which the upper edge of the glass 15 is adapted to slide.

When the glass 15 is moved to the ventilating position as illustrated in Figs. 2 and 3, the top edge thereof will lie between the pads 39 thus forming a complete seal between the glass 15 and the header bar 18 until such time as the occupant of the vehicle desires to lower the glass to provide ventilation along the top of the glass as well as along the forward edge thereof. When the glass is moved upwardly to fully closed position, the top edge thereof will lie within the channel-shaped weather strip 38 and will also be guided by the pads 39 to assist in preventing rattling of the glass in view of the same being held in spaced relation with the header bar 18.

In Figs. 1 and 2, I have shown the door as including upwardly converging edge frame members, the rear edge frame member converging at a less angle from the perpendicular than the front edge frame member. It is, of course, desirable to have the front edge of the door formed at substantially the same angle as the windshield to thus permit of better body design but if desired the sides of the door may be formed at any angle as best suits the fancy of the designer.

In the construction heretofore described, it will be apparent that the glass is preferably of an irregular shape, the rear edge of which slides in the channel-shaped weather strip 31 formed in the rear edge frame member 17. Beneath the opening 14 in the door, the front edge frame member 16 is preferably provided with a channel parallel with the channel formed in the rear edge frame member so that the glass beneath the door opening is guided at both its front and rear edges. The channel in the front side frame member 16 has not been illustrated in detail because the details of construction form no particular part of my invention and I have, therefore, indicated the same generally by the numeral 40.

In Figs. 1 and 2, I have illustrated the rear edge frame member as converging forwardly from the perpendicular and in Fig. 6, I have illustrated a slightly modified form of my invention in which the rear face of the door is substantially perpendicular, the edge frame member 17' being formed at its inner face to converge from the perpendicular as illustrated, to thereby permit the glass 15 to more quickly back away from the front edge frame member to provide the ventilating opening between the front edge of the glass and the front edge frame member before the top edge of the glass is lowered out of the channel formed in the top header bar.

In Figs. 6 and 7 I have shown the front edge frame member as being provided with a channel formed therein in which is inserted a resilient block 42 against which the front edge of the glass 15 may abut when the same is moved to fully closed position. If desired I may use a weather strip channel-shaped in cross section but in some instances it has been found preferable to merely abut the front edge of the glass against a resilient block which creates less resistance in the raising and lowering of the glass and also permits a greater opening between the forward edge of the glass and the front side frame member before the top edge of the glass leaves the channel formed in the top header bar.

Having now described in detail the two embodiments of the invention illustrated, it will be apparent to those skilled in the art that detailed changes in construction can be made and that the shape of the door can be modified to fit various vehicle designs without departing from the spirit and scope of my invention and I, therefore, desire to claim my invention broadly as well as specifically as indicated by the appended claims.

What I claim is:

1. In an enclosed vehicle body, a door therefor having a window opening therein, said door comprising, upwardly converging edge frame members each converging from the perpendicular toward each other and having parallel channels below the window opening, a top header bar having a channel formed therein connecting said frame members, a glass closure for said opening having parallel edges adjacent to the bottom thereof slidable upwardly and downwardly in said parallel channels to closed and open positions respectively, and means within said top header bar to provide a seal between said header bar and glass when said glass has been lowered to provide a space between the front edge of said glass and the front edge frame member.

2. In an enclosed vehicle body, a door therefor having a window opening therein, said door comprising, edge frame members each having channels therein each converging from the perpendicular toward each other at said window opening and having parallel channels below said window opening, a top header bar having a channel therein connecting with the channels in said edge frame members, a glass closure for said opening having parallel edges adjacent to the bottom thereof slidable upwardly and downwardly in said parallel channels, and means within the channel of said top header bar to provide a seal between said header bar and glass when said glass has been lowered to provide a space between the front edge of said glass and the front edge frame member.

3. In an enclosed vehicle body, a door therefor having a window opening therein, said door comprising, a rear edge frame member having a channel therein inclined forwardly to the perpendicular, a front edge member having a channel therein, the portion of the channel adjacent to the window opening converging upwardly toward the channel in said rear edge frame member, and the portion of the channel below the window opening extending substantially parallel with the channel in said rear edge frame member, a glass closure for said opening slidable upwardly and downwardly in the channel below the window opening in said front edge frame member and the channel in said rear edge frame member, said glass moving away from the front edge frame member adjacent to the window opening as the same is lowered from fully closed position to provide an opening between said front edge frame member and glass before the top edge of the glass is lowered out of the channel in said header bar.

JAMES R. HUGHES.